(12) United States Patent
Khorrami et al.

(10) Patent No.: US 8,695,925 B2
(45) Date of Patent: Apr. 15, 2014

(54) ELASTICALLY DEFORMABLE SIDE-EDGE LINK FOR TRAILING-EDGE FLAP AEROACOUSTIC NOISE REDUCTION

(75) Inventors: Mehdi R. Khorrami, Norfolk, VA (US); David P. Lockard, Hampton, VA (US); James B. Moore, Yorktown, VA (US); Ji Su, Yorktown, VA (US); Travis L. Turner, Yorktown, VA (US); John C. Lin, Seaford, VA (US); Karen M. Taminger, Yorktown, VA (US); Seun K. Kahng, Poquoson, VA (US); Scott A. Verden, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/326,779

(22) Filed: Dec. 15, 2011

(65) Prior Publication Data

US 2012/0153086 A1    Jun. 21, 2012

Related U.S. Application Data

(60) Provisional application No. 61/423,350, filed on Dec. 15, 2010.

(51) Int. Cl.
*B64C 9/00* (2006.01)
*B64C 5/10* (2006.01)
*B64C 3/52* (2006.01)

(52) U.S. Cl.
USPC ............ 244/213; 244/212; 244/215; 244/218

(58) Field of Classification Search
USPC .................................. 244/211–215, 218, 219
See application file for complete search history.

(56) References Cited

U.S. PATENT DOCUMENTS

| 5,222,699 | A | * | 6/1993 | Albach et al. .................. 244/213 |
| 5,794,893 | A | * | 8/1998 | Diller et al. .................... 246/213 |
| 5,839,698 | A | * | 11/1998 | Moppert ........................ 244/217 |
| 6,145,791 | A | * | 11/2000 | Diller et al. .................... 244/215 |
| 6,173,924 | B1 | | 1/2001 | Young et al. |
| 6,209,824 | B1 | * | 4/2001 | Caton et al. .................... 244/213 |
| 6,349,903 | B2 | * | 2/2002 | Caton et al. .................... 244/213 |
| 6,467,733 | B1 | * | 10/2002 | Young et al. .................... 244/215 |
| 6,575,407 | B2 | * | 6/2003 | McCallum et al. ........... 244/133 |

(Continued)

OTHER PUBLICATIONS

Storms, B. L. Hayes, J. A., Jaeger, S. M.; and Soderman, P. T., "Aeroacoustic Study of Flap-Tip Noise Reduction Using Continuous Moldline Technology," 6th AIAA/CEAS Aeroacoustics Conference and Exhibit (21st AIAA Aeroacoustics Conference), Lahaina, HI, AIAA-2000-1976, Jun. 12-14, 2000.

(Continued)

*Primary Examiner* — Tien Dinh
*Assistant Examiner* — Michael Wang
(74) *Attorney, Agent, or Firm* — Robin W. Edwards

(57) ABSTRACT

A system is provided for reducing aeroacoustic noise generated by an aircraft having wings equipped with trailing-edge flaps. The system includes a plurality of elastically deformable structures. Each structure is coupled to and along one of the side edges of one of the trailing-edge flaps, and is coupled to a portion of one of the wings that is adjacent to the one of the side edges. The structures elastically deform when the trailing-edge flaps are deployed away from the wings.

11 Claims, 2 Drawing Sheets

(56) References Cited

U.S. PATENT DOCUMENTS

| | | | |
|---|---|---|---|
| 7,850,119 B2* | 12/2010 | Martin Hernandez | 244/131 |
| 8,342,447 B2* | 1/2013 | Etling | 244/90 R |
| 2001/0006207 A1* | 7/2001 | Caton et al. | 244/213 |

OTHER PUBLICATIONS

Streett, C. L., Casper, J. H., Lockard, D. P., Khorrami, M. R., Stoker, R. W., Elkoby, R., Wenneman, W. F., Underbrink, J. R., "Aerodynamic Noise Reduction for High-Lift Devices on a Swept Wing Model," 44th AIAA Aerospace Sciences Meeting and Exhibit, Reno, Nevada, AIAA 2006-212, Jan. 9-12, 2006.

Khorrami, M. R., Lockard, D. P., Humphreys, Jr., W. M., Choudhari, M. M., Van De Ven, T., "Preliminary Analysis of Acoustic Measurements from the NASA-Gulfstream Airframe Noise Flight Test," 14th AIAA/CEAS Aeroacoustics Conference (29th AIAA Aeroacoustics Conference), Vancouver, British Columbia Canada, AIAA 2008-2814, May 5-7, 2008.

* cited by examiner

US 8,695,925 B2

ELASTICALLY DEFORMABLE SIDE-EDGE LINK FOR TRAILING-EDGE FLAP AEROACOUSTIC NOISE REDUCTION

Pursuant to 35 U.S.C. §119, the benefit of priority from provisional application 61/423,350, incorporated by reference herein in its entirety, with a filing date of Dec. 15, 2010, is claimed for this non-provisional application.

ORIGIN OF THE INVENTION

This invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to aeroacoustic noise reduction. More specifically, the invention is a system for reducing aeroacoustic noise originating at opposing side edges of trailing-edge flap components of aircraft high-lift systems.

2. Description of the Related Art

Conventional transport aircraft wing design is driven mainly by cruise efficiency, i.e., adequate lift is generated at high speed for level flight with minimal drag. Conventional high-lift systems using leading-edge slats and trailing-edge flaps were designed to augment lift and improve stall characteristics at the low speeds required during landing. These multi-element airfoil systems increase the effective chord (i.e., stream-wise dimension) of the wing and thus its effective area. The major effect of the multi-element airfoil arrangement is to generate a much larger pressure difference (lift) between the upper (suction) and lower (pressure) surfaces than would be possible via a single airfoil element.

The multi-element airfoil forms a smooth single-element profile during the cruise phase of flight to reduce wing drag. That is, the multiple airfoil elements are nested together in the retracted position. However, when deployed, the multi-element implementation of the high-lift system presents many discontinuities and other unfavorable, geometric features responsible for producing flow unsteadiness, and thus noise. The principal geometric features for producing flow unsteadiness at an airfoil's trailing edge are the side edges of flaps.

Existence of a strong pressure, differential between the bottom and top surface of the flap results in the formation of a complex dual-vortex system. More specifically, near the flap leading edge, the boundary layer on the bottom surface separates at the sharp corner and roils up to form the stronger of the two vortices. Similarly, the thin boundary layer on the side edge separates at the sharp top corner and forms what is initially the weaker of the two vortices. Both vortices gain strength and size along the flap chord because of the constant ingestion of vorticity. Downstream of the flap mid-chord, the side vortex begins to interact and merge with the vortex on the top surface. Eventually, a single dominant stream-wise vortex is formed. Considerable flow unsteadiness (i.e., noise source) is produced during the shear layer roil up, vortex formation, and vortex merging process as well as by the interaction of the vortices with the sharp corners at the flap edge.

SUMMARY OF THE INVENTION

Accordingly, it is an object of the present invention to provide a system for reducing aeroacoustic noise originating at the side edges of a deployed trailing-edge flap.

Another object of the present invention is to provide a system for reducing aeroacoustic noise at the side edges of a flap without compromising an aircraft's cruise efficiency, lift, and stall characteristics at landing.

Other objects and advantages of the present invention will become more obvious hereinafter in the specification and drawings.

In accordance with the present invention, a system is provided for reducing aeroacoustic noise generated by an aircraft having wings equipped with trailing-edge flaps. Each of the trailing-edge flaps includes opposing side edges that nest within one of the wings prior to deployment of the trailing-edge flaps. The system includes a plurality of elastically deformable structures. Each structure is coupled to and along one of the side edges of one of the trailing-edge flaps, and is coupled to a portion of one of the wings that is adjacent to the one of the side edges. The structures elastically deform when the trailing-edge flaps are deployed away from the wings.

DETAILED DESCRIPTION OF THE INVENTION

Figure 1:
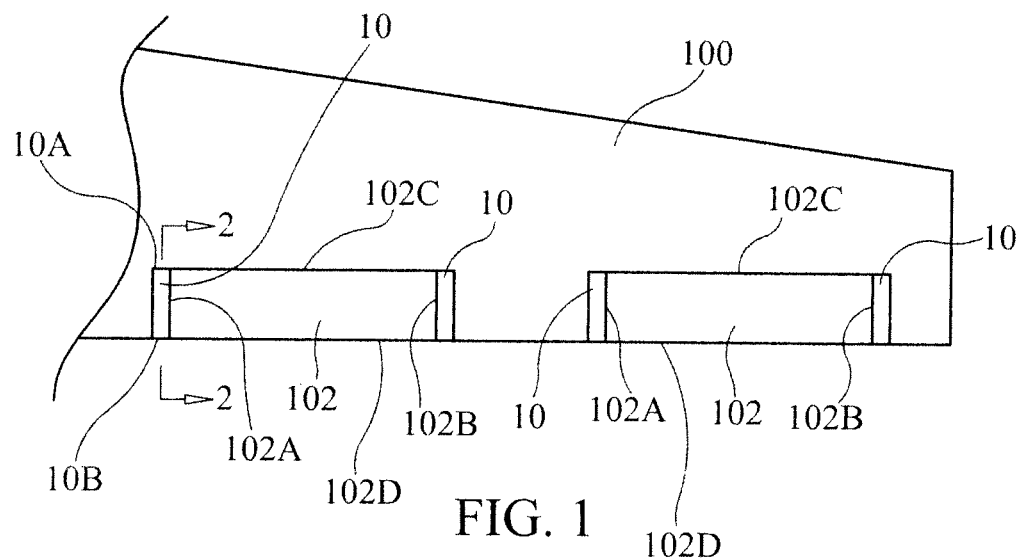
FIG. 1 is a plan view of the top of an aircraft wing equipped with trailing-edge flaps and elastically-deformable flap side-edge links in accordance with an embodiment of the present invention.

Referring now to the drawings and more particularly to FIG. 1, a plan view of the top of an aircraft wing 100 is shown. Wing 100 includes one or more trailing-edge flaps 102 that nest totally or substantially within wing 100 to form a smooth profile that is maintained during the cruise phase of flight as would be understood in the art. The number, size, shape, etc., of flaps 102 are not limitations of the present invention. Further, the mechanisms used to deploy and retract flaps 102 are not limitations of the present invention and will, therefore, be omitted from the instant description and drawings. Still further, the presence or absence of leading edge slats (not shown) does not affect the present invention.

Disposed at opposing side edges (or "sides" as it will also be referred to herein) 102A and 102B of each flap 102 is an elastically deformable link 10. In general, each link 10 is attached to one of sides 102A and 102B and to a portion of wing 100 that is adjacent to the corresponding one of sides 102A and 102B. As will be explained further below, when flaps 102 are deployed (i.e., pushed out and way from their nested position with wing 100 as is understood in the art), each link 10 is capable of elastic deformation. At flap deployment, link 10 simultaneously elongates in a chord-wise direction, bends, and twists to essentially bridge the gap between a corresponding one of sides 102A and 102B and the corresponding regions of wing 300 that sides 102A and 102B nest within when flaps 102 are retracted for the cruise phase of flight. At flap retraction, link 10 elastically returns to its pre-deployment state along with the flap.

Each elastically deformable link 10 must satisfy a number of diverse criteria. Specifically, each link 10 must not affect the aerodynamic efficiency of wing 100 in the cruise phase of flight. That is, in the cruise phase of flight when flaps 102 are not deployed (i.e., typically retracted into wing 100), each link 10 should substantially match the chord-wise cross-sectional shape of the flap's side edge and the portion of the wing where the link is attached. In addition, each link 10 must be capable of deforming by a sufficient amount to support full deployment of flap 102 while possessing elastic properties that allow the link to return to its "substantially matched shape" when flap 102 is retracted. Still further, each link must be capable of being deformed during flap deployment without overburdening the flap deployment actuators. Each link 10 must also be able to sustain the aerodynamic load presented to it in its deployed and retracted configurations. Furthermore, each link 10 is ideally a simple passive device/structure that minimizes weight, complexity, and cost impact on the overall aircraft design.

In addition, to the above-noted criteria, if each link subtends minimum span-wise extent, the links will have a minimal effect on flap area available for producing lift. The desirable consequences of this criterion are many. The link does not need to produce lift. Thus, the link structure will be lightly loaded by the aerodynamic flow. Light aerodynamic load allows a very compliant link design that, in turn, supports the other criteria described above. Furthermore, the precise shape of the deployed link is not as critical as it would be if lift production were a requirement. Thus, the link design can be greatly simplified, thereby also reducing cost and weight.

Given the above criteria, each link 10 can be made from elastomeric materials(s) and aerodynamically shaped to conform to the profile of wing 100 when flaps 102 are stowed therein for the cruise phase of flight. For example, each link 10 can be shaped as a chord-wise segment of flap 102 thereby essentially forming an extension of one of sides 102A and 102B. In other words, with flaps 102 in their stowed/retracted position, each link 10 can be matched (or substantially matched) to a chord-wise cross-section of flap 102 at side 102A or side 102B, and matched (or substantially matched) to the shape of wing 100 where it is coupled thereto.

Figure 2:
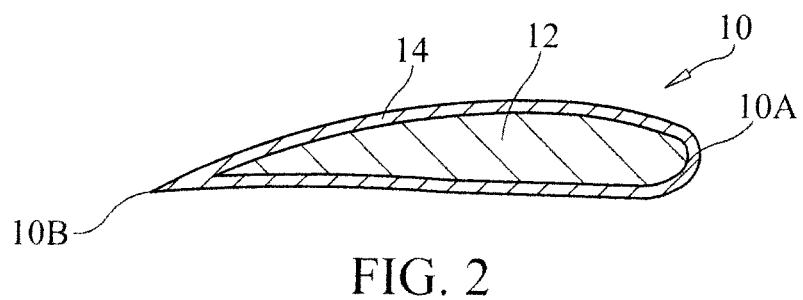
FIG. 2 is a cross-sectional view of a side-edge link in accordance with an embodiment of the present invention as taken along line 2-2 in FIG. 1.

By way of example, a cross-section of an elastically deformable link 10 is shown in FIG. 2. In the illustrated embodiment, link 10 is shaped like an airfoil (e.g., matching the airfoil shape of the flap to which it will be coupled) with a leading edge 10A aligned with the leading edge 102C of flap 102 and with a trailing-edge 10B aligned with the trailing-edge 102D of flap 102. To increase the elastic deformability of link 10 while decreasing the force needed to deform link 10 as well as decreasing the weight thereof, link 10 can be constructed with an elastomeric foam core 12 encased by a nonporous elastomeric skin 14. The base elastomer(s) used to form core 12 and nonporous skin 14 can be the same or different without departing from the scope of the present invention. The choice of elastomer(s) in the present invention will be dictated by the mechanical requirements of a particular application. By way of examples, a suitable elastomeric foam is the Flex-Foam-iT series available commercially from Smooth-On, Inc., and a suitable elastomeric skin is EP1150 commercially available from Eager Plastics, Inc.

Foam core 12 and skin 14 can be distinctly delineated (as shown). However, the present invention is not so limited as link 10 could also be constructed such that foam core 12 gradually blends or changes into nonporous skin 14. The delineation between foam and skin or the blending of foam-to-skin can be accomplished during the fabrication of link 10 where the particular choice of fabrication is not a limitation of the present invention.

Figure 3:
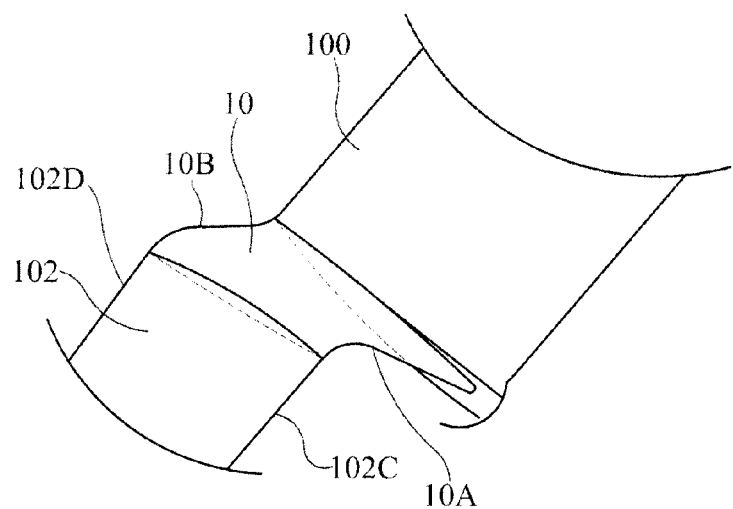
FIG. 3 is a perspective view of a deployed flap illustrating a side-edge link in its elastically deformed configuration.

As mentioned above, when flaps 102 are deployed away from wing 100 as is known in the art, each link 10 elastically deforms at flap side edges 102A and 102B to fill the gap formed between each flap side edge and the portion of the wing adjacent thereto. FIG. 3 illustrates one link 10 in its deformed state as flap 102 is deployed away from wing 100. With link 10 so-deformed, link 10 delays pressure equalization of the air moving over and under the wing thereby relegating the roll-up process and vortex formation to a region that is well downstream of the flap's trailing edge. As a result, the unsteady interaction of the vortical flow with the sharp edges at the flap's tips is eliminated. It has been shown both computationally and experimentally that the present invention's approach to the flap side-edge virtually eliminates one noise production mechanisms at the flap's side edges. At the same time, the link is confined to a very short spanwise extent so that the structure is subjected to minimal lift loads.

Figure 4:
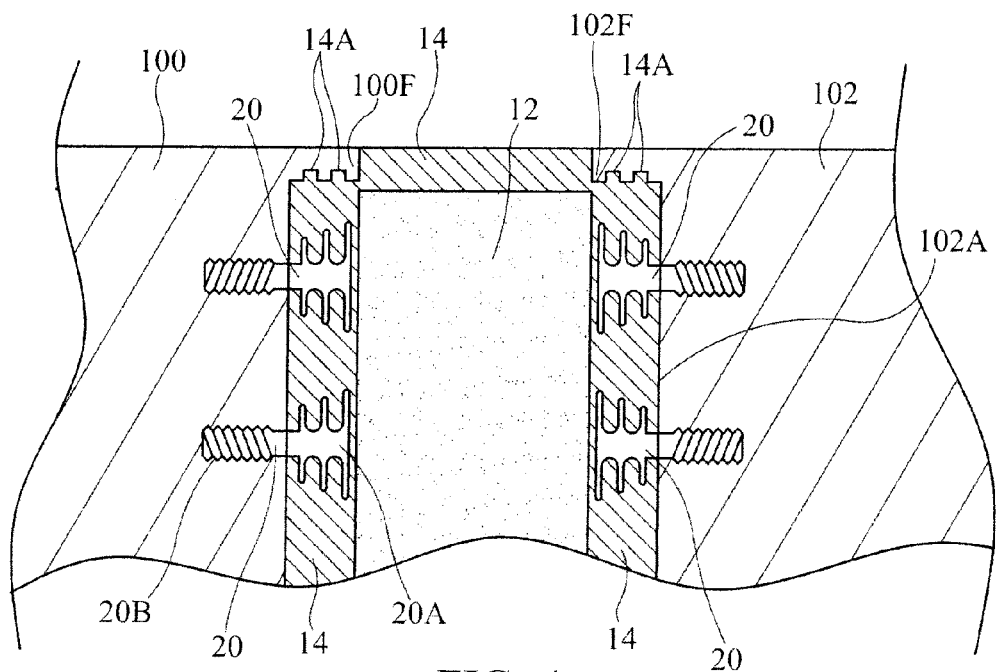
FIG. 4 is a cross-sectional view of a portion of an elastically deformable link coupled to a wing and flap's side edge using a plurality of fir tree fasteners in accordance with an embodiment of the present invention.

The coupling of each link 10 to a corresponding flap side edge and adjacent wing portion can be accomplished in a variety of ways without departing from the scope of the present invention. By way of example, FIG. 4 illustrates the use of structure-engagement fittings 14A and a number of fir tree fasteners 20 to mechanically couple link 10 to wing 100 and flap 102 at (for example) side edge 102A. More specifically, each fastener's head 20A is captured in link 10 (e.g., retained in skin 14 as shown) and each fastener's threaded end 20B is screwed into either wing 100 or flap 102. Coupling of link 10 no wing 100 and flap 102 can be further enhanced by having skin 14 define fittings 14A around the edges thereof for compressed/fitted engagement with corresponding fittings 100F and 102F formed/provided on wings 100 and flap 102, respectively. The mechanical coupling could also include hard mounting plates/assemblies (not shown) for use in combination with (or in place of) fasteners 20. Still further, other types of fasteners/mounting systems can be used without departing from the scope of the present invention.

The advantages of the present invention are numerous. The elastically deformable links offer a simple, lightweight, and cost effective solution to aeroacoustic noise originating at the side edges of a deployed flap. The links can be configured to subtend minimal spanwise extent so that the lift production from the flap is relatively unaffected. Moreover, the links are not required to sustain aerodynamic lift, thereby greatly relaxing the geometric constraints on the link and simplifying the design. The links can blend with a wing's aerodynamic shape for the cruise phase of flight. The links are readily deformed when a flap is deployed but elastically returned to their aerodynamic shape when the flap is retracted. The links could be retro-fitted to existing aircraft and readily incorporated into new aircraft designs.

Although the invention has been described relative to a specific embodiment thereof, there are numerous variations and modifications that will be readily apparent to those skilled in the art in light of the above teachings. In is therefore to be understood that, within the scope of the appended claims, the invention may be practiced other than as specifically described.

What is claimed as new and desired to be secured by Letters Patent of the United States is:

1. A system for reducing aeroacoustic noise generated by an aircraft having wings equipped with trailing-edge flaps wherein each of the trailing-edge flaps includes opposing side edges that nest within one of the wings prior to deployment of the trailing-edge flaps, said system comprising:

a plurality of elastically deformable structures, each of said structures adapted to be coupled only at peripheral edges thereof (i) to and along one of the side edges of one of the trailing-edge flaps, and (ii) to a portion of one of the wings adjacent to the one of the side edges, each of said structures defined only by elastomeric material between said peripheral edges, wherein said structures elastically deform when the trailing-edge flaps are deployed away from the wings.

2. A system as in claim 1, wherein each of said structures comprises an aerodynamic shape.

3. A system as in claim 1 wherein, prior to being elastically deformed, each of said elastically deformable structures is shaped as a chord-wise segment of an airfoil.

4. A system as in claim 1, wherein each of said structures comprises:
  an elastomeric foam; and
  a non-porous elastomeric skin encasing said elastomeric foam and defining said peripheral edges.

5. A system as in claim 4, wherein each of said structures comprises an aerodynamic shape.

6. A system as in claim 4 wherein, prior to being elastically deformed, each of said structures is shaped as a chord-wise segment of an airfoil.

7. A system for reducing aeroacoustic noise generated by an aircraft having wings equipped with trailing-edge flaps wherein each of the trailing-edge flaps includes opposing side edges that nest within one of the wings prior to deployment of the trailing-edge flaps, said system comprising:
  a plurality of elastically deformable structures, each of said structures formed by an elastomeric foam encased in a non-porous elastomeric skin; and
  a mounting system for coupling only said elastomeric skin of each of said structures to and along one of the side edges of one of the trailing-edge flaps, and adapted to be coupled to a portion of one of the wings adjacent to the one of the side edges, wherein only said elastomeric foam defines a spanwise extent for each of said structures between peripheral edges of said elastomeric skin, wherein said structures elastically deform when the trailing-edge flaps are deployed away from the wings.

8. A system as in claim 7, wherein each of said structures comprises an aerodynamic shape.

9. A system as in claim 7 wherein, prior to being elastically deformed, each of said elastically deformable structures is shaped as a chord-wise segment of an airfoil.

10. A system for reducing aeroacoustic noise generated by an aircraft having wings equipped with trailing-edge flaps wherein each of the trailing-edge flaps includes opposing side edges that nest within one of the wings prior to deployment of the trailing-edge flaps, said system comprising:
  a plurality of elastically deformable structures, each of said structures adapted to be coupled only at peripheral edges thereof (i) to and along one of the side edges of one of the trailing-edge flaps while substantially matching a chord-wise cross-section thereof prior to deployment of the trailing-edge flaps, and (ii) to a portion of one of the wings adjacent to the one of the side edges white substantially matching a chord-wise cross-section of said portion prior to deployment of the trailing-edge flaps, each of said structures defined only by elastomeric material between said peripheral edges, wherein said structures elastically deform when the trailing-edge flaps are deployed away from the wings.

11. A system as in claim 10, wherein each of said structures comprises:
  an elastomeric foam; and
  a non-porous elastomeric skin encasing said elastomeric foam and defining said peripheral edges.

\* \* \* \* \*